(No Model.)

N. W DARROW.
WHEEL SKATE.

No. 266,978. Patented Nov. 7, 1882.

WITNESSES:
Fred. G. Dieterich
P. C. Dieterich

INVENTOR.
Norman W. Darrow

ATTORNEYS.

UNITED STATES PATENT OFFICE.

NORMAN W. DARROW, OF KANSAS CITY, MISSOURI.

WHEEL-SKATE.

SPECIFICATION forming part of Letters Patent No. 266,978, dated November 7, 1882.

Application filed April 28, 1882. (No model.)

*To all whom it may concern:*

Be it known that I, NORMAN W. DARROW, a citizen of the United States, residing at Kansas City, in the county of Jackson and State of Missouri, have invented new and useful Improvements in Wheel-Skates.

The nature of my invention consists in providing wheel-skates with mechanism so arranged as to move the wheels by the gravity of the operator. The shaft or axle of each wheel is provided with a spur-wheel, over which passes an endless chain, so attached to the foot-rest that by the weight of the operator the desired motion is obtained.

The mechanism of my invention is fully explained in the following specification, and illustrated in the accompanying drawings, in which—

Figure 1:
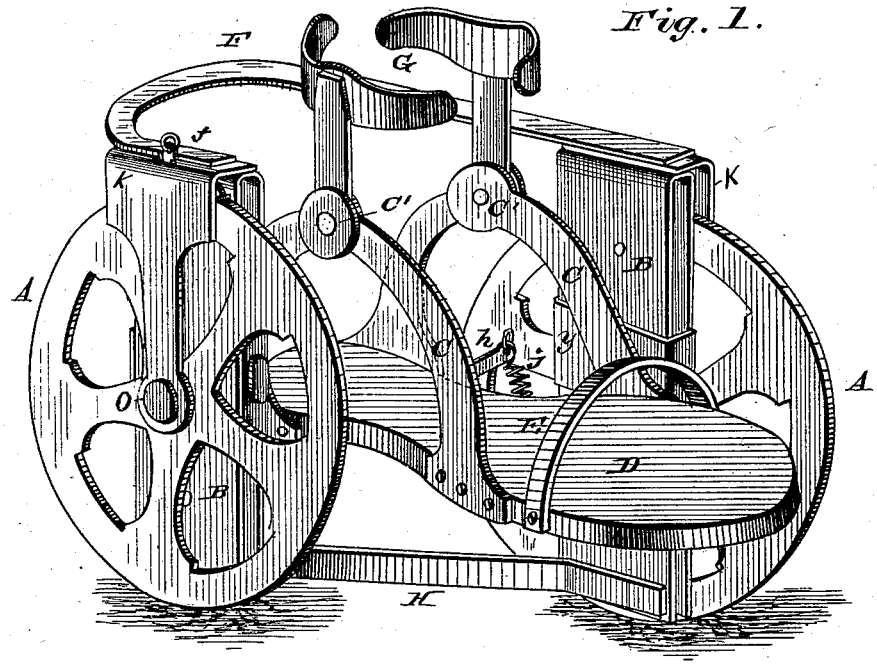
Figure 2:
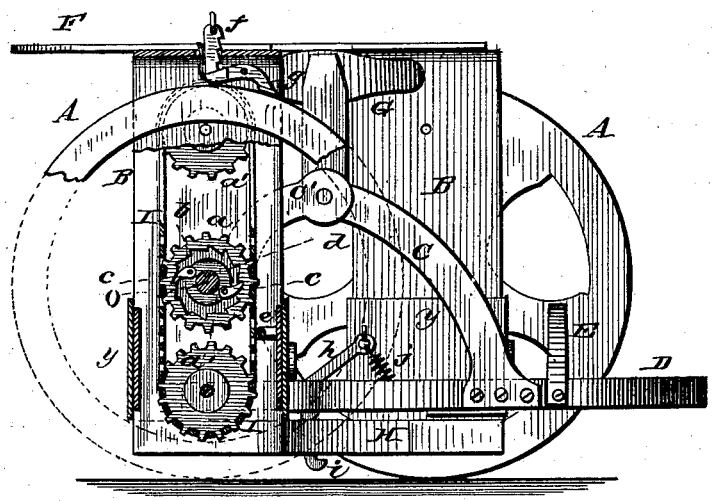

Figure 1 is a vertical perspective view of the entire plan. Fig. 2 is a vertical section, showing the mechanism and connections of the various parts.

Similar letters refer to similar parts throughout the several views.

In constructing my skates I use two wheels, one on each side of the foot-rest. (Shown in Fig. 1, A A, also in Fig. 2.) I form a case, B, for each wheel A, in which the spur-wheels $a\ a'$ are incased, and have their axle-bearings in the plates forming the case B. (Shown in Fig. 2.) The spur-wheel $a'$ may be firmly attached to the axle, or work loosely thereon. The spur-wheel $a$, of which the ratchet $b$ forms a part, turns loosely on its axle. The plate $d$, supporting the pawls $c\ c$, is firmly attached to the axle or shaft, which passes through $a$, case B, and wheel A. Wheels A A are each firmly attached to its axle O. An endless chain, I, surrounding the spur-wheels $a\ a'$, is attached at $e$ to a sliding plate, $y$, so connected to case B as to move freely up and down. (Shown in Fig. 2.) The sliding plate $y$ is firmly attached to the foot-rest D. The cases B B stand in a vertical position between the foot-rest D and wheels A A, and are supported by the axles of A A. The cases B B are held in position by the brace H at the bottom and the brace F at the top. (Shown in the drawings.) The foot-rest D is provided with supporting-braces C C, one on each side of the foot. Braces C C are provided with leg-braces G, and have working-joints C', to correspond to the motion of the ankle-joint. Braces G may be held to the legs by straps or other suitable means.

Plates K K, attached to cases B B at the top, serve as bearings for axles O O and support for wheels A A, Fig. 1. E is a strap to hold the foot in connection with the rest D.

Attached to the foot-rest D is the catch $i$, used, when desirable, in descending an inclined surface. By drawing a wire or any suitable attachment to the lever $h$ the catch $i$ is brought under the brace H and holds the foot-rest down at will of the operator. When desirable to let loose the catch $i$ the tension upon the wire or cord is slackened, and spring $j$ causes $i$ to loose its hold on H. The wheels A A are supplied with a brake upon each, or only one, as desirable, and used at the will of the operator, (shown at $f$ in Figs. 1 and 2.) By using a dog in place of attachment at $e$, I accomplish the same motion of the wheels and chain. The dog at $e$ will cling to the chain and move it down with the descent of the foot; but when the foot rises the dog slacks its hold and rises with D, ready to cling to I when D begins to descend.

In the place of spur-wheels $a'$ in Fig. 2, rollers may be used.

The endless chain may be made of any suitable material.

I am aware that there are skates made to move by a rocking motion of the foot-rest, provided with ratch-connection to wheel. My skates are propelled by the endless chains passing over and in contact with spur-wheels, connected with axles of the wheels, and foot-rests connected with endless chains, all acted on by the weight and method of foot-lifting by the operator.

Having thus fully explained the construction and working of my invention, what I claim, and desire Letters Patent for, is—

1. The foot-rest of wheel-skates, when so constructed that the entire rest is raised up by the foot and forced down by the gravity or weight of the operator, as described, and for the purpose set forth.

2. The endless chain, in combination with the foot-rest of wheel-skates, as described, and for the purpose set forth.

3. The pawls, ratch, and spur-wheel $a$, in combination with the endless chain and foot-rest, as herein described, and for the purpose set forth.

4. In combination with the foot-rest, the sliding plate, as described, and for the purpose set forth.

NORMAN W. DARROW.

Witnesses:
SAMUEL HUFFMAN,
MARVIN J. HORTON.